US012632913B2

(12) United States Patent
Mohseni et al.

(10) Patent No.: US 12,632,913 B2
(45) Date of Patent: May 19, 2026

(54) SYSTEMS AND METHODS FOR GENERATING DATA STRUCTURES USING LANGUAGE MODELS BASED ON DISTRIBUTED NETWORK COMMUNICATIONS

(71) Applicant: DK Crown Holdings Inc., Boston, MA (US)

(72) Inventors: Robin Mohseni, Billericay (GB); Gengyuan Zhang, Boston, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/360,873

(22) Filed: Oct. 16, 2025

(65) Prior Publication Data

US 2026/0112242 A1     Apr. 23, 2026

Related U.S. Application Data

(60) Provisional application No. 63/708,504, filed on Oct. 17, 2024, provisional application No. 63/708,528, (Continued)

(51) Int. Cl.
G07F 17/32          (2006.01)
G06F 40/40          (2020.01)

(52) U.S. Cl.
CPC ........ G07F 17/323 (2013.01); G07F 17/3237 (2013.01); G07F 17/3288 (2013.01); G06F 40/40 (2020.01)

(58) Field of Classification Search
CPC .............. G07F 17/323; G07F 17/3237; G07F 17/3288; G06F 40/40
(Continued)

(56) References Cited

U.S. PATENT DOCUMENTS 9,558,620 B2    1/2017    Froy et al.
10,311,670 B2    6/2019    Brahmandam et al.
(Continued)

FOREIGN PATENT DOCUMENTS

CN          116310582 A      6/2023
WO      WO-2023/064563 A1    4/2023
(Continued)

OTHER PUBLICATIONS

Cureton, et al., "Federated learning for intent classification." In 2023 IEEE 19th International Conference on Intelligent Computer Communication and Processing (ICCP), pp. 315-322. IEEE, 2023. (Year: 2023).

(Continued)

*Primary Examiner* — Michael A Cuff
(74) *Attorney, Agent, or Firm* — Foley & Lardner LLP

(57) ABSTRACT

Systems and methods for generating data structures using language models based on distributed network communications are disclosed. A system can maintain a plurality of data structures. Each of the plurality of data structures can correspond to a first set of parameters for a first time period and a second set of parameters for a second time period. The system can generate, using the language model and parameters, indications of changed parameters for the plurality of data structures. The system can receive, from a client device, a prompt including a request. The system can generate, using the language model, the prompt, and the indications of changed parameters, an output message identifying at least one data structure that satisfies the request. The message can identify a change in parameters associated with the at least one data structure. The system can provide the output message to the client device.

18 Claims, 4 Drawing Sheets

Related U.S. Application Data filed on Oct. 17, 2024, provisional application No. 63/708,554, filed on Oct. 17, 2024, provisional application No. 63/708,492, filed on Oct. 17, 2024, provisional application No. 63/708,542, filed on Oct. 17, 2024, provisional application No. 63/708,509, filed on Oct. 17, 2024, provisional application No. 63/711,415, filed on Oct. 24, 2024, provisional application No. 63/719,406, filed on Nov. 12, 2024, provisional application No. 63/741,297, filed on Jan. 2, 2025, provisional application No. 63/741,671, filed on Jan. 3, 2025.

(58) Field of Classification Search
USPC ......................................................... 463/25
See application file for complete search history.

(56) References Cited

U.S. PATENT DOCUMENTS

| | | | |
|---|---|---|---|
| 10,825,303 B2 * | 11/2020 | McDonald .......... G07F 17/3288 |
| 10,950,086 B2 | 3/2021 | Brahmandam et al. |
| 11,094,171 B2 | 8/2021 | Huke et al. |
| 11,704,000 B1 | 7/2023 | Mcivor et al. |
| 11,735,006 B2 | 8/2023 | Nelson et al. |
| 11,756,379 B2 | 9/2023 | Huke et al. |
| 11,763,637 B2 | 9/2023 | Huke et al. |
| 11,776,362 B2 | 10/2023 | Nelson et al. |
| 11,785,280 B1 | 10/2023 | Dakss et al. |
| 12,008,862 B2 | 6/2024 | Inamdar et al. |
| 12,067,039 B1 | 8/2024 | Campos et al. |
| 12,067,849 B2 | 8/2024 | Storm et al. |
| 12,079,449 B2 | 9/2024 | Mcivor et al. |
| 12,118,320 B2 | 10/2024 | Gelfenbeyn et al. |
| 12,128,288 B1 | 10/2024 | Redman et al. |
| 12,190,683 B2 | 1/2025 | Huke et al. |
| 12,307,861 B1 | 5/2025 | Todisco et al. |
| 12,322,246 B2 | 6/2025 | Turner |
| 12,444,266 B2 * | 10/2025 | Joao .................... G07F 17/3288 |
| 12,457,239 B1 | 10/2025 | Mantin et al. |
| 12,477,036 B1 | 11/2025 | Tenbuuren et al. |
| 2002/0068633 A1 * | 6/2002 | Schlaifer ............. G07F 17/3244 |
| | | | 463/43 |
| 2008/0311981 A1 * | 12/2008 | Schugar .............. G07F 17/3262 |
| | | | 463/26 |
| 2010/0121808 A1 | 5/2010 | Kuhn |
| 2010/0328066 A1 | 12/2010 | Walker et al. |
| 2012/0310926 A1 | 12/2012 | Gannu et al. |
| 2013/0274007 A1 | 10/2013 | Hilbert et al. |
| 2014/0024435 A1 | 1/2014 | Scott |
| 2015/0038236 A1 | 2/2015 | Robbins et al. |
| 2016/0086441 A1 | 3/2016 | Cohen et al. |
| 2016/0155350 A1 | 6/2016 | Dragicevic et al. |
| 2016/0189483 A1 | 6/2016 | Ballman |
| 2016/0196723 A1 | 7/2016 | Ballman |
| 2018/0068661 A1 | 3/2018 | Printz |
| 2018/0204417 A1 | 7/2018 | Triplett |
| 2018/0225911 A1 | 8/2018 | Washington et al. |
| 2019/0012876 A1 | 1/2019 | Brahmandam et al. |
| 2019/0122482 A1 | 4/2019 | Amaitis et al. |
| 2019/0318582 A1 | 10/2019 | Barak |
| 2019/0325028 A1 | 10/2019 | Palanichamy et al. |
| 2019/0361966 A1 | 11/2019 | Munro et al. |
| 2019/0392684 A1 | 12/2019 | Mcdonald et al. |
| 2020/0027314 A1 | 1/2020 | Pilnock et al. |
| 2020/0118040 A1 | 4/2020 | Dey et al. |
| 2020/0234543 A1 | 7/2020 | Schwartz et al. |
| 2021/0118264 A1 * | 4/2021 | Nelson ................... G06Q 50/34 |
| 2021/0217277 A1 | 7/2021 | Huke et al. |
| 2021/0217278 A1 * | 7/2021 | Huke .................... G07F 17/323 |
| 2021/0233344 A1 | 7/2021 | Amaitis et al. |
| 2021/0248707 A1 | 8/2021 | Huke et al. |
| 2021/0256650 A1 | 8/2021 | Huke et al. |
| 2021/0272415 A1 | 9/2021 | Huke et al. |
| 2021/0280006 A1 | 9/2021 | Pace |
| 2021/0319666 A1 * | 10/2021 | Salivar ................ G07F 17/3288 |
| 2021/0342550 A1 | 11/2021 | Palanichamy et al. |
| 2021/0343122 A1 | 11/2021 | Warren |
| 2021/0375090 A1 | 12/2021 | Huke et al. |
| 2022/0122601 A1 | 4/2022 | Cronin |
| 2022/0139160 A1 | 5/2022 | Huke et al. |
| 2022/0157114 A1 | 5/2022 | Huke et al. |
| 2022/0165118 A1 | 5/2022 | Huke et al. |
| 2022/0165120 A1 | 5/2022 | Huke et al. |
| 2022/0172560 A1 | 6/2022 | Huke et al. |
| 2022/0188366 A1 | 6/2022 | Song et al. |
| 2022/0270432 A1 | 8/2022 | Mendell et al. |
| 2022/0351568 A1 | 11/2022 | Smith |
| 2022/0358808 A1 | 11/2022 | Huke et al. |
| 2022/0417603 A1 | 12/2022 | Pleiman |
| 2023/0011114 A1 | 1/2023 | Guy et al. |
| 2023/0082553 A1 | 3/2023 | Mendell |
| 2023/0124722 A1 | 4/2023 | Polson et al. |
| 2023/0162563 A1 | 5/2023 | Turner |
| 2023/0185579 A1 | 6/2023 | Eranpurwala et al. |
| 2023/0196871 A1 | 6/2023 | Inamdar et al. |
| 2023/0252848 A1 | 8/2023 | Isgar |
| 2023/0259714 A1 | 8/2023 | Lange |
| 2023/0267805 A1 | 8/2023 | Edsall |
| 2023/0350928 A1 | 11/2023 | Hill et al. |
| 2023/0351845 A1 | 11/2023 | Mendell et al. |
| 2023/0360488 A1 | 11/2023 | Alyekhin |
| 2023/0360489 A1 | 11/2023 | Alyekhin |
| 2023/0360494 A1 | 11/2023 | Alyekhin |
| 2023/0394930 A1 | 12/2023 | Shore et al. |
| 2023/0410591 A1 | 12/2023 | Monteverdi |
| 2024/0029511 A1 | 1/2024 | Teruuchi |
| 2024/0086648 A1 | 3/2024 | Han et al. |
| 2024/0086773 A1 | 3/2024 | Oppenheimer |
| 2024/0282296 A1 | 8/2024 | Bhathena et al. |
| 2024/0312312 A1 * | 9/2024 | Flint ................... G07F 17/3288 |
| 2024/0320510 A1 | 9/2024 | Kundu et al. |
| 2024/0346256 A1 | 10/2024 | Qin |
| 2024/0350924 A1 | 10/2024 | Orlow |
| 2024/0362409 A1 | 10/2024 | Kuan |
| 2024/0362968 A1 | 10/2024 | Lyons et al. |
| 2024/0362973 A1 | 10/2024 | Owoyemi |
| 2024/0367054 A1 | 11/2024 | Nelson et al. |
| 2024/0378940 A1 | 11/2024 | Latifi et al. |
| 2024/0403845 A1 | 12/2024 | O'Hanlon et al. |
| 2024/0412058 A1 | 12/2024 | Mayande et al. |
| 2025/0046150 A1 | 2/2025 | Huke et al. |
| 2025/0077913 A1 | 3/2025 | Vodeniktov et al. |
| 2025/0086190 A1 | 3/2025 | Azarmi |
| 2025/0094143 A1 | 3/2025 | Huang |
| 2025/0095438 A1 | 3/2025 | Russ et al. |
| 2025/0103624 A1 | 3/2025 | Carta et al. |
| 2025/0118151 A1 | 4/2025 | Williams |
| 2025/0118156 A1 | 4/2025 | Jovanovic |
| 2025/0124063 A1 | 4/2025 | Isslieb et al. |
| 2025/0124340 A1 | 4/2025 | Ni et al. |
| 2025/0140075 A1 | 5/2025 | Groset et al. |
| 2025/0157284 A1 | 5/2025 | Wolfe et al. |
| 2025/0161811 A1 | 5/2025 | Assaad et al. |
| 2025/0174083 A1 | 5/2025 | Huke et al. |
| 2025/0191437 A1 | 6/2025 | Hanson et al. |
| 2025/0191440 A1 | 6/2025 | Bradley et al. |
| 2025/0209891 A1 | 6/2025 | Jacquet et al. |
| 2025/0232126 A1 | 7/2025 | Ma et al. |
| 2025/0238449 A1 | 7/2025 | Sharma et al. |
| 2025/0265310 A1 | 8/2025 | Barnes |
| 2025/0278633 A1 | 9/2025 | Smith et al. |
| 2025/0291866 A1 | 9/2025 | Park et al. |
| 2025/0294091 A1 | 9/2025 | Mukherjee et al. |
| 2025/0299053 A1 | 9/2025 | Cuomo et al. |
| 2025/0299536 A1 | 9/2025 | Chun et al. |
| 2025/0307302 A1 | 10/2025 | Kolugur et al. |
| 2025/0307572 A1 | 10/2025 | Shtar et al. |
| 2025/0307639 A1 | 10/2025 | Jin et al. |
| 2025/0316134 A1 | 10/2025 | Vaccaro |
| 2025/0316139 A1 | 10/2025 | Vaccaro |
| 2025/0316145 A1 | 10/2025 | Merati |
| 2025/0322092 A1 | 10/2025 | Troiani et al. |
| 2025/0322168 A1 | 10/2025 | Sharma |

(56) References Cited

U.S. PATENT DOCUMENTS

| | | |
|---|---|---|
| 2025/0322295 A1 | 10/2025 | Brin et al. |
| 2025/0329218 A1 | 10/2025 | Russ et al. |
| 2025/0348580 A1 | 11/2025 | Galinkin |
| 2025/0355929 A1 | 11/2025 | Lara Silva et al. |
| 2025/0356725 A1 | 11/2025 | Nowak |
| 2025/0363856 A1 | 11/2025 | Turner et al. |
| 2026/0024524 A1 | 1/2026 | Perkins et al. |

FOREIGN PATENT DOCUMENTS

| | | |
|---|---|---|
| WO | WO-2023/140642 A1 | 7/2023 |
| WO | WO-2024/194418 A1 | 9/2024 |

OTHER PUBLICATIONS

Non-Final Office Action on U.S. Appl. No. 19/357,856 DTD Jan. 2, 2026.

Non-Final Office Action on U.S. Appl. No. 19/357,889 DTD Jan. 12, 2026.

Non-Final Office Action on U.S. Appl. No. 19/357,902 DTD Dec. 16, 2025.

Non-Final Office Action on U.S. Appl. No. 19/357,918 DTD Jan. 13, 2026.

Non-Final Office Action on U.S. Appl. No. 19/358,919 DTD Dec. 23, 2025.

Non-Final Office Action on U.S. Appl. No. 19/358,959 DTD Dec. 2, 2025.

Non-Final Office Action on U.S. Appl. No. 19/359,002 DTD Jan. 13, 2026.

Non-Final Office Action on U.S. Appl. No. 19/359,036 DTD Jan. 13, 2026.

Non-Final Office Action on U.S. Appl. No. 19/359,438 DTD Dec. 19, 2025.

Non-Final Office Action on U.S. Appl. No. 19/359,531 DTD Dec. 12, 2025.

Non-Final Office Action on U.S. Appl. No. 19/359,534 DTD Dec. 11, 2025.

Non-Final Office Action on U.S. Appl. No. 19/360,020 DTD Jan. 14, 2026.

Non-Final Office Action on U.S. Appl. No. 19/360,307 DTD Jan. 20, 2026.

Non-Final Office Action on U.S. Appl. No. 19/360,328 DTD Dec. 11, 2025.

Non-Final Office Action on U.S. Appl. No. 19/360,383 DTD Dec. 15, 2025.

Non-Final Office Action on U.S. Appl. No. 19/360,405 DTD Jan. 5, 2026.

Non-Final Office Action on U.S. Appl. No. 19/360,512 DTD Dec. 30, 2025.

Non-Final Office Action on U.S. Appl. No. 19/360,809 DTD Jan. 14, 2026.

Non-Final Office Action on U.S. Appl. No. 19/360,880 DTD Dec. 31, 2025.

Non-Final Office Action on U.S. Appl. No. 19/360,886 DTD Dec. 8, 2025.

Non-Final Office Action on U.S. Appl. No. 19/360,892 DTD Jan. 13, 2026.

Schick et al., "Toolformer: Language Models Can Teach Themselves to Use Tools", Feb. 9, 2023, arXiv.com, pp. 1-17 (Year: 2023).

Final Office Action on U.S. Appl. No. 19/357,856 DTD Apr. 21, 2026.

Final Office Action on U.S. Appl. No. 19/357,902 DTD Feb. 9, 2026.

Final Office Action on U.S. Appl. No. 19/358,919 DTD Apr. 21, 2026.

Final Office Action on U.S. Appl. No. 19/358,959 DTD Feb. 5, 2026.

Final Office Action on U.S. Appl. No. 19/359,438 DTD Apr. 2, 2026.

Final Office Action on U.S. Appl. No. 19/359,531 DTD Mar. 25, 2026.

Final Office Action on U.S. Appl. No. 19/360,328 DTD Feb. 26, 2026.

Final Office Action on U.S. Appl. No. 19/360,383 DTD Feb. 3, 2026.

Final Office Action on U.S. Appl. No. 19/360,512 DTD Apr. 22, 2026.

Lee, et al., "Sportify: Question Answering with Embedded Visualizations and Personified Narratives for Sports Video," in arXiv preprint arXiv:2408.05123 (2024). (Year: 2024).

Non-Final Office Action on U.S. Appl. No. 19/357,967 DTD Jan. 28, 2026.

Non-Final Office Action on U.S. Appl. No. 19/358,916 DTD Jan. 28, 2026.

Non-Final Office Action on U.S. Appl. No. 19/360,368 DTD Jan. 28, 2026.

Non-Final Office Action on U.S. Appl. No. 19/360,597 DTD Jan. 30, 2026.

Non-Final Office Action on U.S. Appl. No. 19/360,886 DTD Feb. 19, 2026.

Notice of Allowance on U.S. Appl. No. 19/359,534 DTD Feb. 11, 2026.

Notice of Allowance on U.S. Appl. No. 19/360,383 DTD Apr. 17, 2026.

Structure Guided Prompt: Instructing Large Language Model in Multi-Step Reasoning by Exploring Graph Structure of the Text (Year: 2024).

* cited by examiner

300

302 — MAINTAIN WAGER OPPORTUNITIES AND ODDS VALUES

304 — GENERATE INDICATIONS OF CHANGED ODDS

306 — RECEIVE REQUEST FOR WAGER RECOMMENDATION

308 — GENERATE OUTPUT MESSAGE IN RESPONSE TO THE REQUEST

310 — PROVIDE OUTPUT MESSAGE TO CLIENT DEVICE

SYSTEMS AND METHODS FOR GENERATING DATA STRUCTURES USING LANGUAGE MODELS BASED ON DISTRIBUTED NETWORK COMMUNICATIONS

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Patent Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission using conventional networking technology.

SUMMARY

At least one other aspect of the present disclosure is directed to a system. The system can maintain a plurality of wager opportunities. Each of the plurality of wager opportunities can correspond to a first set of odds values for a first time period and a second set of odds values for a second time period. The system can generate, using the language model, the first set of odds values, and the second set of odds values, a plurality of indications of changed odds for the plurality of wager opportunities. The system can receive, from a client device, a prompt comprising a request for a wager recommendation. The system can generate, using the language model, the prompt, and the plurality of indications of changed odds, an output message identifying at least one wager opportunity of the plurality of wager opportunities selected to satisfy the request. The message can identify a change in odds associated with the at least one wager opportunity. The system can provide the output message to the client device in response to the request.

In some implementations, the system can generate the plurality of indications of changed odds in a second output message generated by the language model. The system can generate an input context for the language model using the prompt and the second output message. The client device can be associated with a player profile. The system can determine that the output message is to be generated using the plurality of indications of changed odds based on at least one historical wager identified in the player profile.

In some implementations, the system can determine that the output message is to be generated using the plurality of indications of changed odds based on the prompt received from the client device. The system can include classifying an intent of the prompt as requesting one or more wager opportunities having changed odds that satisfy an odds change threshold. The system can determine the odds change threshold based on the request. The system can select a subset of the plurality of indications of changed odds for inclusion in an input context of the language model based on the odds change threshold. Each indication of the plurality of indications of changed odds can include an identifier of a respective wager opportunity of the plurality of wager opportunities.

In some implementations, the client device can be associated with a player profile identifying a wager associated with a first wager opportunity of the plurality of wager opportunities. The system can determine that a first indication of the plurality of indications of changed odds corresponds to the first wager opportunity. The system can provide a notification to the client device identifying the first indication. The system can receive a second request from the client device identifying the at least one wager opportunity. The system can determine that the at least one wager opportunity corresponds to an indication of the plurality of indications of changed odds that exceeds a threshold.

In some implementations, the system can automatically generate, using the language model, the indication, and the plurality of wager opportunities, a second output message identifying at least one second wager opportunity of the plurality of wager opportunities. The system can determine a respective frequency at which each of the plurality of wager opportunities are placed. The system can generate the output message further based on the respective frequency at which each of the plurality of wager opportunities are placed.

At least one aspect of the present disclosure relates to a method. The method can be performed, for example, by one or more processors coupled to a non-transitory memory. The method can include maintaining a plurality of wager opportunities. Each of the plurality of wager opportunities can correspond to a first set of odds values for a first time period and a second set of odds values for a second time period. The method can include generating, using the language model, the first set of odds values, and the second set of odds values, a plurality of indications of changed odds for the plurality of wager opportunities. The method can include receiving, from a client device, a prompt comprising a request for a wager recommendation. The method can include generating, using the language model, the prompt, and the plurality of indications of changed odds, an output message identifying at least one wager opportunity of the plurality of wager opportunities selected to satisfy the request. The message can identify a change in odds associated with the at least one wager opportunity. The method can include providing the output message to the client device in response to the request.

In some implementations, the method can include generating the plurality of indications of changed odds in a second output message generated by the language model. The method can include generating an input context for the language model using the prompt and the second output message. The client device can be associated with a player profile. The method can include determining that the output message is to be generated using the plurality of indications of changed odds based on at least one historical wager identified in the player profile. The method can include determining that the output message is to be generated using the plurality of indications of changed odds based on the prompt received from the client device.

In some implementations, the method can include classifying an intent of the prompt as requesting one or more wager opportunities having changed odds that satisfy an odds change threshold. The method can include determining the odds change threshold based on the request. The method can include selecting a subset of the plurality of indications of changed odds for inclusion in an input context of the language model based on the odds change threshold. Each indication of the plurality of indications of changed odds can include an identifier of a respective wager opportunity of the plurality of wager opportunities.

In some implementations, the client device can be associated with a player profile identifying a wager associated with a first wager opportunity of the plurality of wager opportunities. The method can include determining that a first indication of the plurality of indications of changed odds corresponds to the first wager opportunity. The method can include providing a notification to the client device identifying the first indication. The method can include receiving a second request from the client device identifying the at least one wager opportunity. The method can include determining that the at least one wager opportunity corresponds to an indication of the plurality of indications of changed odds that exceeds a threshold. The method can include automatically generating, using the language model, the indication, and the plurality of wager opportunities, a second output message identifying at least one second wager opportunity of the plurality of wager opportunities. The method can include determining a respective frequency at which each of the plurality of wager opportunities are placed. The method can include generating the output message further based on the respective frequency at which each of the plurality of wager opportunities are placed.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
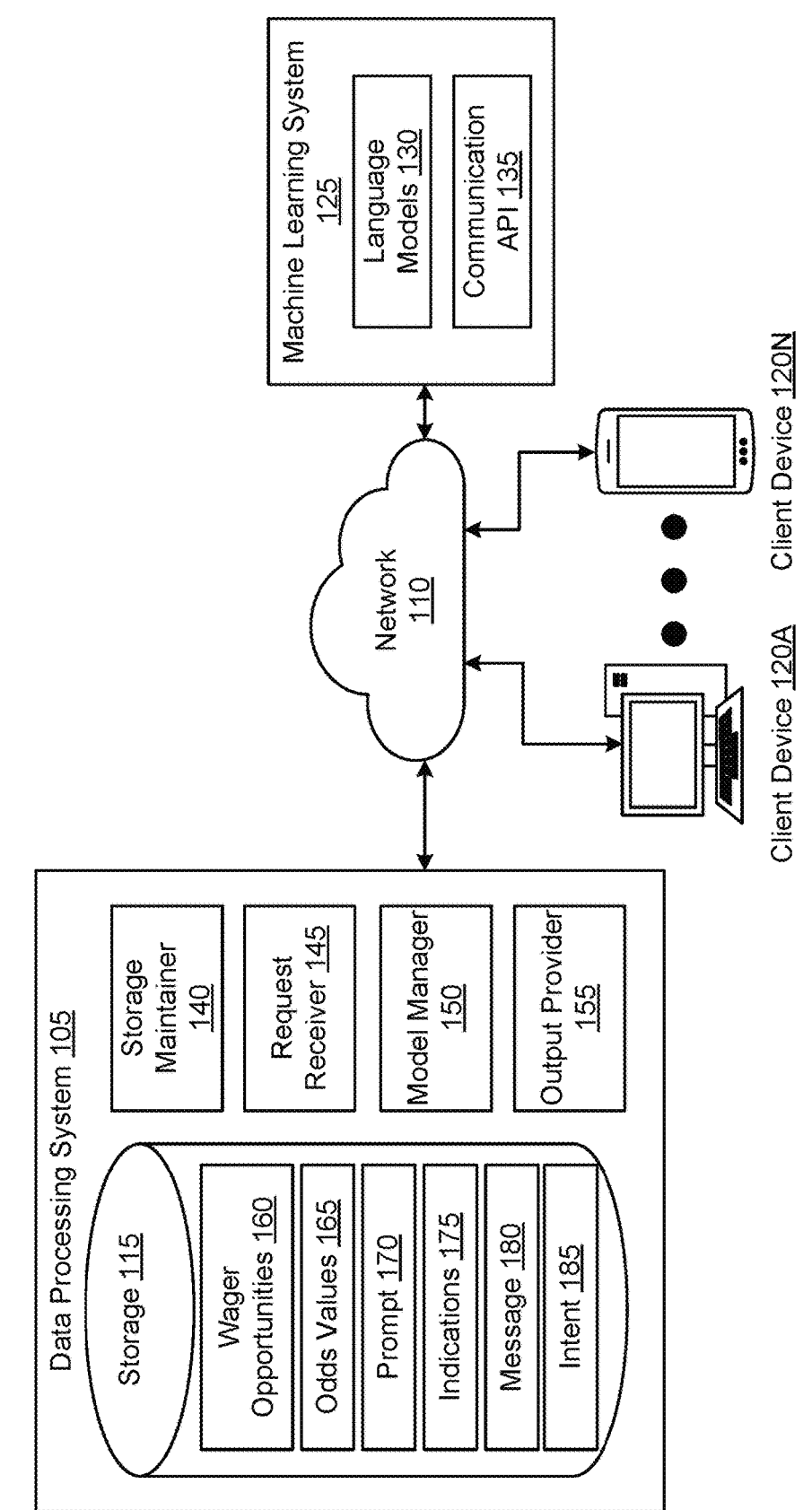
FIG. 1 is a block diagram of an example system for generating data structures using language models based on distributed network communications, in accordance with one or more implementations.

Below are detailed descriptions of various concepts related to, and implementations of, techniques, approaches, methods, apparatuses, and systems for parameter search and adjustment. The various concepts introduced above and discussed in greater detail below may be implemented in numerous ways, as the described concepts are not limited to any particular manner of implementation. Examples of specific implementations and applications are provided primarily for illustrative purposes.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

Referring now to FIG. 1, illustrated is a block diagram of an example system 100 for generating data structures using language models based on distributed network communications. The system 100 can include at least one data processing system 105, one or more client devices 120A-120N (sometimes generally referred to in the singular or the plural as "client device(s) 120") and a machine learning system 125. The data processing system 105 can be a server system, a cloud-computing platform, a local computing system, a node in a distributed network, a desktop computer, a client device, or any other system that can process information. The data processing system 105 can be or include one or multiple computing nodes, servers, or distributed processing systems. The data processing system 105 can include a storage maintainer 140, a request receiver 145, an model manager 150, an output provider 155, and at least one storage 115. The storage 115 can include one or more wager opportunities 160, odds values 165, prompts 170, indications 175, messages 180, and/or intents 185. Although shown here as internal to the data processing system 105, the storage 115 can be external to the data processing system 105, for example, as a part of a cloud computing system or an external computing device in communication with the devices (e.g., the data processing system 105, the client device 120, etc.) of the system 100 via the network 110.

Each of the components (e.g., the storage maintainer 140, the request receiver 145, the model manager 150, the output provider 155, and the storage 115, etc.) of the system 100 can be implemented using the hardware components or a combination of software with the hardware components of a computing system, such as any other computing system described herein. Each of the components (e.g., the storage maintainer 140, the request receiver 145, the model manager 150, the output provider 155, and the storage 115, etc.) can be implemented on a single data processing system 105 or implemented on multiple, separate data processing systems 105. Although various processes are described herein as being performed by the data processing system 105, it should be understood that said operations or techniques may also be performed by other computing devices (e.g., one or more client devices 120, models of the machine learning system 125, etc.), either individually or via communications with the data processing system 105. Each of the components of the data processing system 105 can perform the functionalities detailed herein.

The data processing system 105 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all the components and perform any or all the functions of the computer system 400 described in connection with FIG. 4.

In some implementations, the data processing system 105 may communicate with the client device 120, for example, to receive, transmit, or process data, via the network 110. In one example, the data processing system 105 can be or can include an application server or webserver, which may include software modules allowing various computing devices (e.g., the client device 120, etc.) to access or manipulate data stored by the data processing system 105.

The network 110 can include computer networks such as the Internet, local, wide, metro or other area networks, intranets, satellite networks, other computer networks, such as mobile phone (voice or data) communication networks, or combinations thereof. The data processing system 105 of the system 100 can communicate via the network 110 with one or more computing devices, such as the one or more client devices 120. The network 110 may be any form of computer network that can relay information between the data processing system 105, the one or more client devices 120, the machine learning system 125, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive or transmit data within the network 110.

The network 110 may further include any number of hardwired or wireless connections. Any or all of the computing devices described herein (e.g., the data processing system 105, the one or more client devices 120, the computer system 100, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 110. Any or all of the computing devices described herein (e.g., the data processing system 105, the one or more client devices 120, the computer system 100, etc.) may also communicate wirelessly with the computing devices of the network 110 via a proxy device (e.g., a router, network switch, or gateway).

The client device 120 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 120 can include at least one computing device or server that can perform various operations as described herein.

Each client device 120 can be a personal computer, a laptop computer, a television device, a smart phone device, a mobile device, or another type of computing device. Each client device 120 can be implemented using hardware or a combination of software and hardware. Each client device 120 can include a display or display portion. The display can include a display portion of a television, a display portion of a computing device, or another type of interactive display (e.g., a touchscreen, etc.). Each client device 120 may include one or more I/O devices (e.g., a mouse, a keyboard, digital keypad, buttons, trackpads, touch sensor of the touch-screen, etc.). The display can include a touch screen displaying an application, such as a web browser application or a native application, which may be used to access the functionality of the data processing system 105, as described herein.

A client device 120 can receive interactions from a user (sometimes referred to herein as a "player"). The client device 120 may also receive interactions via any other type of I/O device. The interactions can result in interaction data, which can be stored and transmitted by the processing circuitry of the client device 120. The interaction data can include, for example, interaction coordinates, an interaction type (e.g., drag, click, swipe, scroll, tap, etc.), and an indication of an actionable object (e.g., an interactive user-interface element, such as a button, hyperlink, etc.) with which the interaction occurred. The interaction data can identify a user-interface element with which the interaction occurred.

The client device 120 can be a smartphone device, a mobile device, a personal computer, a laptop computer, a television device, a broadcast receiver device (e.g., a set-top box, a cable box, a satellite receiver box, etc.), or another type of computing device. The client device 120 can be implemented hardware or a combination of software and hardware. The client device 120 can include a display or display portion. The display can include a touchscreen display, a display portion of a television, a display portion of a computing device, a monitor, a GUI, or another type of interactive display (e.g., a touchscreen, a graphical interface, etc.) and one or more I/O devices (e.g., a touchscreen, a mouse, a keyboard, digital key pad). The client device 120 can include or be identified by a device identifier, which can be specific to each respective client device 120. The device identifier can include a script, code, label, or marker that identifies a particular client device 120. In some implementations, the device identifier can include a string or plurality of numbers, letters, characters, or any combination numbers, letters, and characters. In some embodiments, each client device 120 can have a unique device identifier. The client device 120 can include or be associated with a player profile.

Each client device 120 can include a client application. The client application can be or include a web browser or a local application that communicates with the data processing system 105. The client application can include and/or present graphical user interfaces. The graphical user interfaces may be referred to as application interfaces. The client application can initiate and/or terminate communication sessions. The client application can input prompts 170 into one or more communication sessions and generate one or more data records. The client application can display a history of prompts 170 and messages 180 within one or more communication sessions. The client application can include a web application, a server application, a resource, a desk-top, or a file. Other functionalities described herein may also be provided by the client application.

The client application can include a local application (e.g., local to a client device 120), hosted application, a SaaS application, a virtual application, a mobile application, or other forms of content. In some implementations, the client application can include or correspond to applications provided by remote servers or third-party servers. The application may generate or otherwise present one or more graphical user interfaces (e.g., interactive user-interface elements). The graphical user interfaces can include user-selectable hyperlinks, buttons, graphics, videos, images, or other interactive elements to control the functionality of the application make corresponding requests to the data processing system 105 to perform any of the techniques described herein. Interactions with such interactive user-interface elements (sometimes referred to as "actionable objects") can cause the client application executing on the respective client device 120 to generate a signal, which can cause the client application to perform further operations corresponding to the actionable object.

In some implementations, the graphical user interface can present prompts 170 and messages 180 within the communication session. For example, the graphical user interface can display a message 180 on the odds of a bet or wager in response to a prompt 170 from a client device 120. The client application can be executing on each client device 120 and may be provided to the client device 120 by the data processing system 105 or via an application distribution platform. The graphical user interface can allow players to input prompts 170 related to sports betting, such as requests for odds for upcoming games, the likelihood of a particular team winning a match, or the potential payout for various types of bets (e.g., moneyline, point spread, or over/under). For example, if a player submits a prompt 170 asking for the latest odds on a football game, the client application can present a message 180 that displays the updated moneyline odds, showing which team is favored to win and by how much.

In some implementations, in response to interactions with graphical user interfaces, the client device 120, via the client application and/or the network 110, can send (e.g., transmit) and/or receive information (e.g., data) to the data processing system 105. The data transmitted can include information about prompts 170 (e.g., questions or text input by the users, wager amounts, selections to request information about a status of a contest, etc.).

The machine learning system 125 can include one or more language models 130 and one or more communication application programming interfaces (API) 135. The machine learning system 125 can include any type of computing system that can execute one or more machine learning models, which may include the language model(s) 130 and/or any other machine learning models described herein. The machine learning system 125 can include one or more machine learning models trained on various datasets, including but not limited to datasets for large language models. The machine learning system 125 can include a cloud system, one or more servers, a distributed remote system, or any combination thereof. The machine learning system 125 can include processing components that include, but are not limited to, one or more central processing units (CPUs), one or more graphics processing unit (GPUs), tensor processing units (TPUs), or the like. The machine learning system 125 can include a memory operable to store one or more instructions for operating components of the machine learning system 125 and operating components operably coupled to the machine learning system 125. For example, the instructions can include firmware, software, hardware, operating systems, or embedded operating systems, among others.

In some implementations, the machine learning system 125 can be internal to the data processing system 105. For example, although shown as separate from the data processing system 105, in some implementations the machine-learning system 125 (or the functionality thereof) may be implemented as part of the data processing system. In some implementations, the machine learning system 125 can be external to the data processing system 105 and can be accessed via the network 110, for example, using one or more API keys or authentication processes to process input contexts and/or prompts 170 from the data processing system 105. In some implementations, the machine learning system 125 implement or otherwise provide access to one or more application programming interfaces (APIs), via which the data processing system 105 and/or the client device 120 can access the language model 130 or other functionality of the machine learning system 125.

The language models 130 of the machine learning system 125 can include any artificial intelligence, machine learning, or deep learning models for understanding and generating human language. The language models 130 can include natural language processing (NLP) models such as large language models. The language model 130 can be trained on text data. For instance, the language models 130 can be trained/updated/fine-tuned to perform a variety of text processing tasks, including, but not limited to, generating text, formatting instructions, comprehending and processing natural language input, and responding to queries with contextually relevant information.

The language model 130 can include a transformer architecture, such as a generative pre-trained transformer (GPT) architecture. The transformer architecture can include an encoder that can process the input text and a decoder that can generate the output text. The language model 130 can include multiple layers that can operate to process and generate text. For example, embedding layers can convert words or tokens into dense vectors of fixed size, attention layers can use mechanisms such as self-attention to weigh the importance of different tokens in a sequence, and feed-forward layers can apply transformations to the data to learn complex patterns. In some implementations, the language model 130 can use a self-attention mechanism to weight different parts of the input sequence when generating predictions. The language model 130 may be pre-trained (and in some implementations fine-tuned, updated, or re-trained) using large corpuses of natural language text data, such that the language model 130 can efficiently process and provide output corresponding to natural language input.

The language model 130 can receive an input context generated via the model manager 150. As described herein, the input context can include relevant wager opportunities 160 identified based on the prompt 170. The data processing system 105 can transmit the input context to the language model 130. The machine learning system 125 can execute the language model 130 to process the input context. The language model 130 can generate an output data structure including one or more tokens representing an output message generated based on the input context.

The language model 130 can process a wide range of input formats, including but not limited to text, audio, images, video, or other modalities. In some implementations, based on the input context, the language model 130 can generate output, which can range from simple text responses to complex data structures, or combinations thereof. In some implementations, the language model 130 can use the input context to iteratively predict the next token word or phrase to generate responses in response to input contexts. Tokens may include a numerical representation of text data, function calls, special separators/control signals, or any other data described herein. In some implementations, the language model 130 can generate instructions or commands that automatically invoke tools or functions to perform specific tasks or operations.

The language model 130 can receive the additional wagers via the input context. The data structure can include details regarding the wager type (e.g., moneyline, point spread, parlay) and relevant details, such as teams, odds, and bet amounts. In some implementations, the language model 130 can generate an additional data structure or update an existing data structure in response to receiving an input context that includes updated information, such as new odds for a specific wager. The data structure can include a timestamp indicating when the update occurred and a list of changes. For example, each change can specify the field that was modified. The language model 130 can transmit the updated data structure, including the updated wager data, to the client device 120 via the data processing system 105.

Natural language input can have a syntactic structure in which individual words, collections of words (e.g., phrases), or relative positions of words (e.g., word order) can indicate specific meanings. The language model 130 can be trained/updated/fine-tuned to parse sentences into their grammatical components to understand the structure and relationships between words. The language model 130 can use phrasing structure rules that define how words combine to form phrases and sentences. The language model 130 can receive an input context, which can include a sequence of tokens and/or text data structured in a format compatible with an input layer of the language model 130. In some implementations, the language model 130 may include or may be associated with a tokenizer model, which can convert a text-based or media-based input context into a sequence of tokens compatible with an input layer of the language model 130. The input context may include natural language, structured data, or combinations thereof, and may specify instructions for the model to generate particular output according to the techniques described herein.

As described herein, the input context can include relevant wager opportunities 160 identified based on the prompt. The data processing system 105 can transmit the input context to the language model 130. The machine learning system 125 can execute the language model 130 to process the input context. The language model 130 can generate an output data structure including one or more tokens representing an output message generated based on the input context. In some implementations, tokens or combinations of tokens can indicate special control data for the language model, including but not limited to the beginning of prompts/natural language text, or the beginning/end of wager opportunities, deep links, or other types of media modalities, among others.

The communication API 135 of the machine learning system 125 can facilitate interaction between the one or more language models 130 and the data processing system 105. For example, the communication API 135 can receive prompts and/or input contexts provided by the data processing system 105 using prompts 170 from a client device 120 (e.g., text queries, commands, or other forms of input). For example, the communication API 135 can receive input data from a model manager 150. Input data from a model manager 150 can include requests to allow or restrict other input data from being passed on to a language model 130, or requests to allow or restrict responses generated by a language model 130 from being output to a data processing system 105 or client device 120. The communication API 135 can forward the parsed input to a language model 130 for processing. The communication API 135 can retrieve a response generated by a language model 130 after the language model 130 has processed an input. The communication API 135 can format a response generated by a language model 130 into a suitable structure (e.g., JSON, XML) that can be easily understood and utilized by other applications. A communication API 135 can utilize authentication mechanisms (e.g., API keys, OAuth tokens) to verify the identify of a requesting identity to ensure secure communication.

In some implementations, the storage 115 can be a computer-readable memory that can store or maintain any of the information described herein. The storage 115 can store or maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via the network 110. In some implementations, the storage 115 can be internal to the data processing system 105. In some implementations, the storage 115 can exist external to the data processing system 105 and may be accessible via the network 110. The storage 115 can be distributed across many different computer systems or storage elements, and may be accessed via the network 110 or a suitable computer bus interface. The data processing system 105 can store, in one or more regions of the memory of the data processing system 105 or in the storage 115, the results of any or all computations, determinations, selections, identifications, generations, constructions, or calculations in one or more data structures indexed or identified with appropriate values.

Any or all values stored in the storage 115 may be accessed by any computing device described herein, such as the data processing system 105, to perform any of the functionalities or functions described herein. In some implementations, a computing device, such as a client device 120, may utilize authentication information (e.g., username, password, email, etc.) to show that the client device 120 is authorized to access requested information in the storage 115. The storage 115 may include permission settings that indicate which users, devices, or profiles are authorized to access certain information stored in the storage 115. In some implementations, instead of being internal to the data processing system 105, the storage 115 can form a part of a cloud computing system. In such implementations, the storage 115 can be a distributed storage medium in a cloud computing system and can be accessed by any of the components of the data processing system 105, by the one or more client devices 120 (e.g., via one or more user interfaces, etc.), or any other computing devices described herein.

A communication session can enable a player to interact with one or more language models 130, for example, a communication session can be displayed visually on a client device 120. A communication session displayed on a client device 120 (e.g., via graphical user interface) can display one or more data records. For example, a communication session displayed on a client device 120 can display a plurality of prompts 170 transmitted from a client device 120 and a plurality of messages 180 transmitted from a machine learning system 125 in response to one or more prompts 170.

The storage 115 can store wager opportunities 160 for one or more live events (e.g., sports events). The wager opportunities 160 can include event information, identifying the specific live event each wager is tied to, such as participant (e.g., athletes) names, team names, game details, etc. The wager opportunities 160 can include bet options, including different types of bets available for each event, such as moneyline, point spread, or over/under, among other markets. The wager opportunities 160 can include a record of the number of wagers placed. In some implementations, the data processing system 105 can track the popularity of specific wager types or specific wager opportunities, such as single game parlays, quick single game parlays (Quick SGPs), by tracking the number of times the corresponding wager types/opportunities have been selected. For example, each wager opportunity 160 can include or be associated with a counter that is incremented each time the wager opportunity is placed by a player via the data processing system 105. The wager opportunities 160 can include data corresponding to historical wager opportunities (e.g., past wagers) used to calculate or adjust odds values 165 associated with the current wager opportunities.

The storage 115 can store odds values 165 (e.g., the payout ratio associated with each wager and how much a winning wager would return) that correspond to each wager opportunity 160. Odds values 165 for wager opportunities 160 can change over time. For example, as live event unfolds, the performance of participants (e.g., athletes, teams) and key moments (e.g., scoring, injuries) can affect the likelihood of certain outcomes, which can change the odds values 165 for wager opportunities 160. As live events approaches their conclusion, odds values 165 can become more volatile. Changes in factors such as weather conditions, participant injuries, or unexpected circumstances during the live events can change the odds values 165 for wager opportunities 160.

In some implementations, odds values 165 associated with wager opportunities 160 can be dynamically adjusted based on various factors, such as live event data/developments, fluctuations in betting volume, and historical wager patterns, among others. In some implementations, upon detecting events, such as scores or timeouts, the data processing system 105 can recalculate and adjust odds values 165. Odds values 165 can include a first set of odds values 165 for a first time period and a second set of odds values 165 for a second time period. The first time period can be before the live event begins or in early stages of the live event. The first set of odds values 165 for the first time period can be referred to as historical odds 165. The first set of odds values 165 can represent the payout ratio or probabilities associated with wager opportunities 160 at an earlier point in time (e.g., first time period). For example, the first set of odds values 165 can be based on initial statistics (e.g., team performance, athlete form), historical data (e.g., win/loss records, trends in similar events), and/or market sentiments. The first set of odds values 165 can represent baseline expectations for the live event before any live updates or real-time changes occur. The second set of odds values 165 can be referred to as current odds 165. The second set of odds values 165 can correspond to the second time period (e.g., after a portion of the live event has occurred). The second set of odds values 165 can reflect real-time conditions (e.g., live events game updates, market activities such as shifts in wager, etc.). The first set of odds values 165 and the second set of odds values 165 for wager opportunities 160 can remain the same if no significant events or changes have occurred between the first time period and the second time period (e.g., no scoring changes, no injuries, minimal market activity, etc.).

In some implementations, the storage 115 can store or otherwise maintain one or more prompts 170 in one or more data structures. A prompt 170 can be transmitted by a client device 120 in response to one or more interactions with an application executing on the client device 120. A prompt 170 can include text data from various sources, including a string or plurality of numbers, letters, characters, or any combination of numbers, letters, and characters. A prompt 170 can include data in one or more data structures. For example, a prompt 170 can include data of one or more intents 185. Prompts 170 transmitted by client devices 120 can be displayed on a client device 120, for example, during the communication session to which it corresponds.

In some implementations, the prompt 170 can be a string of text, such as a question, command, data related to wager opportunities, or statement, that the player provides via interaction(s) at the client device 120 or client application to communicate with the data processing system 105. For example, a prompt 170 can include, "what are the odds for today's football game?". The prompt 170 can include numerical input, such as a request that include calculations or comparisons. The prompt 170 can be a request to perform an action, such as initiating a process, retrieving data, identifying wager recommendations, identifying application interfaces and/or webpages, generating any other information as output. The user can input a prompt 170 asking to "generate a report of all the football game scores of games played this week". The prompt 170 can include follow-up texts to a previous interaction, where the user continues an ongoing conversation with the language model 130 (e.g., the prompt can include "Can you provide more details?").

The storage 115 can store or otherwise maintain one or more indications 175 of changed odds 165 for the plurality of wager opportunities 160 in one or more data structures. The indications 175 can be internal markers within the data processing system 105, that can track and manage updated odds values 165 for each wager opportunity 160. The indications can provide a historical analysis of how odds values 165 have changed over time for a given wager opportunity 160. The indications 175 can allow real-time monitoring of odds values 165 fluctuations across multiple wager opportunities 160. By maintaining a historical record of how odds values 165 have changed over time, the indications 175 can allow the data processing system 105 to recalculate potential payouts, adjust wager recommendations, or update other data processing system 105 components involved in managing live wager opportunities 160.

The indications 175 can be numerical values that can be displayed on a client device 120. The indications 175 can represent changes or fluctuations in odds values 165 over time for the plurality of wager opportunities 160. The numerical values can reflect various aspects of how the odds have shifted, such as the magnitude of the change (e.g., from +200 to +150) or the percentage change in the payout ratio. The indications 175 can be used for both internal processing within the data processing system 105 and for display on a client device 120, where players can view and analyze the odds values 165 changes (e.g., in real-time).

The storage 115 can store or otherwise maintain one or more messages 180 in one or more data structures. Each message 180 can be generated by one or more language models 130 and transmitted via one or more communication APIs 135 to the data processing system 105 (or any components thereof). A message 180 may be an output message generated by the language model 130 and/or the machine learning system 125. The message 180 may include text data, such as letters, characters, or any combination of numbers, letters, and characters. For example, when a prompt 170 and/or supplemented input context is received, the language model 130 can processes the input context and generates a message 180 that contains relevant data or information as a response (e.g., wager opportunities 160).

The storage 115 can store or otherwise maintain one or more intents 185 in one or more data structures. An intent 185 can be generated the data processing system 105 or by a language model 130. For example, an intent 185 can be generated by a request receiver 145 and/or model manager 150. An intent 185 can be generated in response to a determination by a language model 130. An intent 185 can be a corresponding prompt 170 or set of prompts 170 transmitted during a communication session. For example, a prompt 170 can have an intent 185 associated with a request for wagers, which may include a wager for particular sport(s), live event(s), team(s), participant(s), wager type(s), or any other intent information. The intent 185 may be a request for information, a request to update wager opportunities, player profile information, bet slips, or any other information described herein.

The data processing system 105 and/or the language model 130 within the machine learning system 125 can generate the intent 185 and store the intent 185 in the storage 115 for further use. The intent 185 can be determined from factors within the communication sessions, such as the content of prompts 170, and in some implementations further based on one or more messages 180 and/or input contexts that are intended to be provided to the language model 130 for processing. An intent 185 can be determined or derived from a prompt 170, the content of a message 180 or prompt 170, the length of the message 180 or prompt 170, the number of messages 180 or prompts 170, or the number of a subset of messages 180 or prompts 170 within a communication session, among other factors.

In some implementations, the data used for processing wager opportunities and the data used to generate the message 180 can be structured differently. For example, for parlay wager opportunities, the message 180 can hierarchical layouts or graphical elements, in some implementations. In some implementations, the message 180 can include interactive elements such as buttons or links that, when clicked or interacted with, automatically cause the application presenting the interactive elements to transmit requests to place one or more wagers corresponding to the wager opportunities 160.

In some implementations, the language models 130 and/or the machine learning system 125 can implement additional or alternative NLP techniques to determine or extract intents 185 from prompts 170. For example, additional machine learning models including transformers, recurrent neural networks (RNNs), named entity recognition (NER), and sentiment analysis models may be used to generate classification(s) of intents 185 for one or more prompts 170. The NLP techniques can be used to process and analyze the text of a prompt 170 to determine the intent 185. NLP techniques can include breaking down a prompt 170 into multiple phrases or segments based on word choice, sentence structure, and context.

In one example, tokenization can be used to break down a prompt 170 into individual words or phrases, which can be processed by the language model 130 or other machine learning models to implement syntactic and semantic analysis and to determine an intent 185. The language models 130, via NLP techniques, can determine the intent 185 across multiple prompts 170 within the same communication session 160. For example, if a player submits multiple prompts 170 about sports betting odds, the data processing system 105 can determine an intent 185 related to sports betting even if keywords are not repeated in every prompt 170. The use of NLP techniques can enhance the ability of the data processing system 105 to interpret complex prompts 170, ensuring that intents 185 are accurately determined. In another example, if the player submits the prompt 170, "What are the odds for Team A tonight?", the secondary language model can analyze the prompt 170 and classify the intent 185 as a request for odds information of one or more wagers for "Team A".

Referring now to the operations of the data processing system 105, the storage maintainer 140 can maintain a plurality of wager opportunities 160 that correspond to one or more live events (e.g., sport events). The storage maintainer 140 can store the wager opportunities 160 in the storage 115. Each of the plurality of wager opportunities 160 can identify at least one of a plurality of teams. For example, a wager opportunity 160 for a soccer game can identify "Team A" and "Team B", and can offer options to bet on the outcome of the soccer match, such as which team will win (moneyline) or how many goals each team will score (over/under). The storage maintainer 140 can maintain in the storage 115 a plurality of wager opportunities 160 identifying at least one of a plurality of participants in the live events. For example, in a basketball game, wager opportunities 160 can include wagers on participants (e.g., athletes), such as predicting how many points a participant will score or whether a participant will achieve a triple-double.

The storage maintainer 140 can maintain in the storage 115 odds values 165 that correspond to the wager opportunities 160. For example, the odds values 165 for a wager opportunity 160 in a soccer match can include the payout ratio for a moneyline bet on "Team A" to win or for an over/under bet on the total number of goals scored. The odds values 165 can dynamically adjust based on real-time developments during the live event, such as scoring updates, participant performance, and external factors (e.g., weather conditions, injuries). The storage maintainer 140 can store in the storage 115 the historical odds values 165 (e.g., odds values 165 corresponding to a first time period) and current odds values 165 (e.g., odds values 165 corresponding to a second time period). The storage maintainer 140 can receive the odds values 165 (e.g., the historical odds values 165 and/or current odds values 165) from various sources, including a backend server, the data processing system 105, and/or the network 110. Upon detecting events such as scoring changes, participant substitutions, or changes in wagering volume, the storage maintainer 140 can store in the storage 115 the updated odds values 165 (e.g., current odds values 165 corresponding to a second time period).

The data processing system 105 can include the request receiver 145. The request receiver 145 can be or include any script, file, program, application, set of instructions, or computer-executable code that is configured to process input data in the form of a prompt 170. The request receiver 145 can include hardware, software, or any combination. A prompt 170 can include any player-provided command, request, or text data. The prompt 170 can include a request or information relating to bet placement, such as an indication of a wager type, a wager amount, or selecting specific live events or outcomes. The request receiver 145 can receive the prompt 170 from the client device 120 in natural language (e.g., a text string). The request receiver 145 can receive prompts through player interactions with the application interface. Player interactions can include clicking buttons, entering text, or using voice commands within one or more application interfaces, among others. In some implementations, the request receiver 145 can identify specific events or triggers, such as player actions or system state changes, which can generate prompts.

In some implementations, the request receiver 145 can receive, from the client device 120, a prompt 170 that includes a request for a wager opportunities 160 (e.g., wager recommendation). For example, a player can submit a prompt 170 asking for the best wager on an upcoming football match, or a specific athlete's performance in the next basketball game. The request receiver 145 can receive and process the prompt 170 and/or the request to allow the data processing system 105 to generate a response (e.g., wager opportunity 160) based on relevant data.

In some implementations, the request receiver 145 can parse and process the prompts 170 and/or the request to extract information, such as wager type, amount, and game selections, among others. The request receiver 145 can execute functions in response to receiving a prompt 170. The request receiver 145 can provide a prompt 170, the request, and any information extracted therefrom, to other components of the data processing system 105 and/or the machine learning system 125 for further processing according to the techniques described herein. The request receiver 145 can format the prompt 170 into a standardized data structure, in some implementations. The request receiver 145 can collect or store records of player prompts 170 in the storage 115. In some implementations, the data processing system 105 can store and/or process the conversation to generate data to improve the classification accuracy of one or more machine learning models.

In some implementations, an intent 185 can be generated by the request receiver 145 and/or model manager 150 based on the prompt 170 and the request. The intent 185 can be generated in response to a determination by a language model 130. The intent 185 can determine the underlying meaning of the request. The intent 185 can be generated to identify the type of wager requested by the user, such as determining that the user wants to place a moneyline bet on a particular team or a parlay bet combining multiple events. The intent 185 can identify the player's preference for a betting market, such as over/under or point spread, based on the player's input and prompt. The intent 185 can be generated to interpret a request for odds values 165. The intent 185 may be a request for information, a request to update wager opportunities, player profile information, bet slips, or any other information described herein.

The data processing system 105 can include the model manager 150. The model manager 150 can be or include any script, file, program, application, set of instructions, or computer-executable code that is configured to determine the classification of the request included in a player input, referred to as a prompt. The model manager 150 can generate, using the language model 130, the first set of odds values 165 (e.g., historical odds values 165), and the second set of odds values 165 (e.g., current odds values 165), a plurality of indications of changed odds for the plurality of wager opportunities. The model manager 150 can compare the first set of odds values 165 (e.g., historical odds values 165), and the second set of odds values 165 (e.g., current odds values 165). In some implementations, the model manager 150 can apply a comparison function to compare the first set of odds values 165 and the second set of odds values 165 by comparing metrics such as payout ratios or probabilities. For example, the model manager 150 can detect if the second set of odds values 165 for "Team A to win" have increased or decreased between the first time period and second time period. The model manager 150 can calculate a percentage change in a metrics such as payout ratios or probabilities between the first time period (for first set of odds values 165) and second time period (for second set of odds values 165). The model manager 150 can flag the wager opportunities 160 if the percentage change exceeds a pre-defined threshold (e.g, odds change threshold). The model manager 150 and the language model 130 can interpret and contextualize the comparison results. The model manager 150 can generate indications 175 of changed odds to highlight changes or shifts in the odds values 165 for the plurality of wager opportunities 160. The storage maintainer 140 can store the indications 175 in the storage 115.

Similar to the request receiver 145, the model manager 150 can parse prompts received from the client device 120 to determine an intent 185 of the prompts 170. For a given prompt, the data processing system 105 can use the model manager 150 to generate an input context for the language model 130 using the prompt and its classification. The input context can include a variety of information, such as prompts, questions, or previous parts of a conversation. The model manager 150 can identify the desired action or information sought by the player.

In some implementations, the model manager 150 can use rule-based techniques to identify intents 185 of input prompts 170 provided by players via the client system 115. For example, the model manager 150 can use a set of predefined rules or patterns that match specific prompts to predefined intents. In some implementations, the model manager 150 can use keyword matching or regular expressions to identify patterns that capture variations in prompts. For example, a rule can specify that a prompt related to placing a wager may indicate a betting intent. In some implementations, the model manager 150 can use machine learning models to identify a wider range of intents, including those that are context-dependent or ambiguous. For example, the model manager 150 can use implement vector machines (SVMs), naive bayes, or deep learning architectures such as recurrent neural networks (RNNs), or language models including transformer models such as BERT, DistilBERT, or generative pre-trained transformer (GPT)-based models. The models can be trained on large datasets of player prompts and their corresponding intents. The model manager 150 can use the machine learning model(s) (e.g., machine learning system 125) to distinguish between player intents 185, such as checking odds, placing wagers, or requesting payouts, among other prompts.

The model manager 150 can process prompts 170 to extract/determine the underlying intent 185 or purpose of the prompts 170. The model manager 150 can categorize the player's prompt 170 into specific intents, such as placing a bet, checking odds, or requesting information about participant attributes or team attributes. The model manager 150 can determine the actions to fulfill the player's request based on the classified intent. For example, if a player enters the prompt "What are the odds for Team A to win tonight?", the model manager 150 can determine that the prompt is a request for wagering information, identify the specific wager type as a moneyline bet.

In some implementations, the model manager 150 may generate an input context for the language model 130 by retrieving various additional information relating to the intent 185 of the prompt 170, including but not limited to data of one or more wager opportunities, data from one or more webpages, application interfaces, or information sources, odds information for one or more wager opportunities, player profile information, historical wagering information for one or more live events, teams, live event participants, or other data, among any other information that may be processed by the language model 130. The input context may be a sequence of characters, tokens, or structured data that is to be provided as input to the language model 130. Data can be provided to the language models 130 via the communication APIs 135 of the machine learning system 125, in some implementations. Messages 180 generated by the language model 130 can be received by the model manager 150 and/or the output provider 155, as described herein, and may be provided for presentation at the client device 120 communicating.

The model manager 150 can generate, using the language model 130, the prompt 170 and the indications 175 of changed odds, an output message 180 identifying at least one wager opportunity 160 of the plurality of wager opportunities 160 selected to satisfy the request. The output message 180 can identify a change in odds associated with the at least one wager opportunity. The model manager 150, via the language model 130, can provide the players with actionable insights into the change in odds values 165.

For example, if a player submits the prompt 170 "Find me some underdog bets with improved odds," the model manager 150 can analyze this prompt 170 to identify wager recommendations 160 with teams and/or participants that are underdogs whose odds values 165 have improved (e.g., became more favored to win). The model manager 150 can, using the machine learning system 125 and/or language model 130, recognizing that the term "underdogs" metaphorically refers to a team and/or participants perceived to be less likely to win a particular live event. The model manager 150 can determine that the intent 185 is to receive a wager opportunity 160 on a team and/or participant whose odds values 165 (e.g., indications 175 of changed odds) have improved. The model manager 150 can determine from the plurality of wager opportunities 160 a wager opportunity 160 where an underdog team and/or participant is identifiable. The model manager 150 can determine from the indications of changed odds 175 team and/or participants whose odds values have decreased (e.g., from +200 to +150), indicating an improvement in the team and/or participants perceived chances of winning. For example, the output message 180 can be, "Consider the following underdogs: Team A (+130) is showing great momentum and their odds have shortened significantly since yesterday. Team B (+200) have announced a key athlete returning from injury, making their odds more attractive."

In another example, if a player submits the prompt 170 "Any surprising line movements in tonight's baseball games?" the model manager 150 can analyze this prompt 170 to determine that the intent 185 is to receive a wager recommendations 160 or to display odds values 165 changes of teams and/or participants with "surprising" line movements. The model manager 150 can, using the machine learning system 125 and/or language model 130, recognizing that the term "surprising" refers to a team and/or participants whose odds values 165 have changed significantly (e.g., odds values 165 changes and/or indications 175 have exceeded an odds change threshold). For example, the output can be a team's odds values 165 lengthening, "Team C's odds have lengthened considerably (+150 to +180) after their star pitcher Athlete X was unexpectedly scratched from the lineup."

In some implementations, the model manager 150 can select a subset of the plurality of wager opportunities 160 that identify one or more participants of the plurality of participants that satisfy the attribute 175 request. The model manager 150 can select a subset of the plurality of wager opportunities 160 by determine the intent 185 of the request. The attribute 175 can be determined from the intent 185. The model manager can filter through the wager opportunities 160 to identify wager opportunities 160 that match the requested attributes. For example, if the player prompt intent is on top-performing soccer athletes, the model manager 150 can search for wager opportunities associated with such participants attributes.

In some implementations, upon receiving a prompt (e.g., a first prompt), the model manager 150 can process the input to identify the player's intent 185, by processing keywords, entities, or semantic meaning. The player can transmit a second prompt 170 to the data processing system 105 (e.g., via the request receiver 145). The model manager 150 can process the first and second prompts to refine, update, and/or identify player's intent 185. For example, if the first prompt reads "Odds for," and the second prompt reads "Team A baseball game tonight," the model manager 150 can determine that the player intends to request one or more wager opportunities 160 for tonight's baseball game for Team A. The data processing system can process the original and subsequent prompts to extract relevant information. For example, based on the combined prompts, the data processing system can extract relevant information about the desired wager type, teams, and specific betting options, among others.

The model manager 150 can generate the output message 180 by providing the input context to the language model. This means that the context surrounding the user's prompts, such as previous interactions or specific requests, can be fed into the language model 130 to generate more relevant and coherent responses. By incorporating the input context, the output provider 155 can enhance the quality of the messages returned, allowing for a more engaging and personalized experience for the user on the client device.

In some implementations, the model manager 150 can generate the plurality of indications 175 of changed odds in the output message 180 by providing the indications 175 as part of the input context for the language model 130. The indications 175 of changed odds 165 can be displayed as part of natural language output, in some implementations, enabling players to view large swings in odds. Players can react to the latest shifts in odds values 165 and make more informed decisions. For example, odds values 165 can fluctuate (e.g., due to player performance, injuries, or market activity) over time, but these fluctuations may not necessarily be reflected in conventional wagering systems. By displaying indications 175 of changed odds, the players can be aware of important developments, especially when changes in odds values 165 can influence the attractiveness or risk of certain wagers. For example, a player can see, via the indications 175, that a team's odds values 165 to win have improved from +200 to +150, indicating that the team's chances of winning have increased. In some embodiments, the indications 175 can be percentage changes in odds values 165 (e.g., when the odds values 165 for a wager opportunity 160 improved by 25%, the indication 175 can be shown numerically as a percentage).

The model manager 150 and/or the output provide 155, based on the player's preference (which can be determined from the intent 185), can customize how the indications 175 are displayed on the client device 120. The indications 175 can be displayed as numerical values alongside visual indicators such as arrows or color coding. For example, an upward arrow or a green color can indicate improving odds values 165 (e.g., from +300 to +200), while a downward arrow or red color could indicate declining odds values 165. Indications 175 can be presented using graphs or charts that display the progression of odds values 165 over time. The player can choose to set threshold values (e.g., via natural language input prompts 170, etc.) for the display of odds values 165 changes such that the client device 120 will present wager opportunities 160 when odds values 165 change by a certain percentage or amount (e.g., a 20% change in odds values 165, or a 20% improvement in odds values, etc.).

The model manager 150 and/or the output provider 155 can determine that the output message 180 can be generated with the plurality of indications 175 of changed odds based on at least one historical wager identified in the player profile. The model manager 150 and/or the output provider 155 can personalize the output message 180 based on the player's previous betting behavior and preferences. The historical wager data can provide player's risk tolerance and favored wager opportunities, each of which may be indicated or otherwise represented in a corresponding player profile. The historical wager data can include previous wager opportunities 160 chosen by the player. For example, if a player submits a prompt 170, "Show me live basketball betting options," the model manager 150 can use the historical data from the player profile and customize the output message to focus on wager opportunities 160 that include the player's betting style, favored teams and/or participants (e.g., "underdog" teams). The output message 180 can include, "Team D (+250) was a longshot earlier, but their odds have improved significantly (+200) as they've gained momentum. This mirrors your past successful bets on underdogs with improving odds." The model manager 150 can recommend wager opportunities 160 that align with the player's interests and can ensures that such wager opportunities 160 with interest the player are highlighted.

The model manager 150 and/or the output provider 155 can classify the intent of a player's prompt as requesting one or more wager opportunities 160 having changed odds values 165 that satisfy an odds values 165 change threshold (e.g., odds change threshold). The model manager 150 can determine the change in magnitude of the odds values 165 of wager opportunities 160. An odds change threshold can be a predefined value set by the data processing system 105. Players can indicate how much the odds values must change for the wager opportunity 160 to be flagged to the player. Players can customize odds change thresholds to enhance their betting strategy by focusing on wager opportunities 160 (e.g., when large odds values 165 changes signal new potential for high returns or reduced risk). For example, when a player submits a prompt 170, such as "Show me big odds changes" or "Find significant odds movements in today's games," the model manager 150 via the language model 130 can interpret the intent 185 to be odds values 165 changes (e.g., indications 175) that meet a certain threshold (e.g., odds change threshold). The odds change threshold can be the minimum amount by which the odds values 165 can change for a wager opportunity 160 to be included in the results. The odds change threshold can be a percentage change, absolute change (e.g., threshold could be an absolute number) and/or a player-defined threshold. Different betting types can have different odds change thresholds.

The model manager 150 can determine the odds change threshold based on the request and/or prompt 170. For example, the player can specify the odds change threshold within the prompt 170, such as "Show me odds for this week's basketball games that have changed by at least 20%" or "Find bets where the odds have increased by +100 or more." The model manager 150, using the language model 130, can interpret these instructions to establish the odds change threshold for the request (e.g., request for wager opportunities 160). If no threshold is provided in the prompt, the model manager 150 can apply a predefined threshold set by the data processing system 105, which can be based on common betting practices or the player's historical behavior. The predefined threshold can vary based on the type of bet (e.g., moneyline, point spread, or parlay), with different thresholds applied for different wager types to better align with the player's betting strategy. For example, if the historical behavior of a player (e.g., the player profile) is wagering on high-risk, high-reward opportunities, the data processing system 105 can set a high threshold to only receive large odds changes, while a more conservative player profile can set a low threshold to receive odds changes with smaller, safer shifts. The data processing system 105 can dynamically update the odds change threshold to allow players to identify opportunities that meet their specific risk tolerance or desired returns. The model manager 150 can select a subset of the plurality of indications 175 of changed odds for inclusion in an input context of the language model 130 based on the odds change threshold. The model manager 150 can filter the total set of indications 175 (markers representing odds values 165 changes) to only include indications 175 that meet or exceed the odds change threshold. The filtered indications 175 subset can be used in the input context to generate more relevant responses within the language model 130.

Each indication of the plurality of indications 175 of changed odds can include an identifier of a respective wager opportunity of the plurality of wager opportunities 160. The indications 175 can include identifiers (e.g., internal markers) that track changes in the odds values 165 (e.g., the payout ratio or probability) for wager opportunities 160. The identifiers can be unique reference (such as a label, code, or ID) that links the odds values 165 changes to a wager opportunity 160.

The client device 120 can be associated with a player profile identifying a wager associated with a first wager opportunity 160 of the plurality of wager opportunities 160. The model manager 150, via the identifiers, can determine that a first indication 175 corresponds to the first wager opportunity 160. The output provider 155 can provide a notification to the client device 120 identifying the first indication, to inform the player of the odds values 165 change. Providing notifications based on odds values 165 changes allows players to stay informed about how wager opportunities 160 are changing (e.g., during live events). For example, if a player places a wager before a live events starts and the odds values 165 changes in the player's favor, the player can receive notifications to adjust their strategy with respect to corresponding wager opportunities 160.

The model manager 150, via the request receiver 145, can receive a second request and/or prompt 170 from the client device identifying the at least one wager opportunity 160. The model manager 150 can determine that the at least one wager opportunity 160 corresponds to an indication 175 of the plurality of indications 175 of changed odds that exceeds a threshold (e.g., pre-defined by the data processing system 105 or set by the player). The model manager 150 can automatically generate, using the language model 130, the indication 175, and the plurality of wager opportunities 160, a second output message identifying at least one second wager opportunity 160 of the plurality of wager opportunities 160. For example, a player's first wager opportunity 160 (e.g., initial bet) can be on Team A to win an upcoming soccer match with odds of +150. The player can send, via the client device 120, a second prompt 170 (e.g., a second request) to check for any updates related to the first wager opportunity 160 on Team A. The second prompt 170 can be, "Are there changes in the odds for my bet on Team A?". The model manager 150 can review the indications 175 of the changed odds values 165 and determine that the odds for Team A have shifted (e.g., from +150 to +100 which is a 20% improvement). If the indications 175 of the changed odds values 165 exceed a threshold a threshold (e.g., pre-defined by the data processing system 105 or set by the player), the model manager 150 can automatically generate, via the language model 130, a second output message 180. The second output message can identify at least one second wager opportunity 160 of the plurality of wager opportunities 160.

The model manager 150 can determine a respective frequency at which each of the plurality of wager opportunities 160 are placed. The model manager 150 can track how often each wager opportunity 160 is selected (e.g., frequency) or placed by players over a certain period of time. The model manager 150 can calculate or analyze the frequency for all available wager opportunities 160. In some implementations, the frequency can be the number of times a wager opportunity 160 is placed by different players within a given timeframe. The model manager 150 can track the number of times players chose to place a bet on each wager opportunity 160. The model manager 150 can identify which wager opportunities 160 are the most popular among players (e.g., similar to market activity). By analyzing wager frequency, when a wager opportunity 160 is frequently placed, the model manager 150 can notify players who have shown similar player profile preferences of the wager opportunity 160. The model manager 150 can generate the output message 180 based on the respective frequency at which each of the plurality of wager opportunities 160 are placed. The model manager can include the frequency at which each of the plurality of wager opportunities 160 are placed in the input context to the language model 130.

The output provider 155 can receive any messages 180 generated by the language model 130 and/or model manager 150 in response to providing one or more prompt(s) 170 and/or input contexts to the language model 130 for processing. In some implementations, the output provider 155 can format the response messages 180 received via the communication API 135 into a suitable structure that allows it to be displayed on a client device 120. In some implementations, the output provider 155 can display messages 180 in JSON or XML structure.

Figure 2:
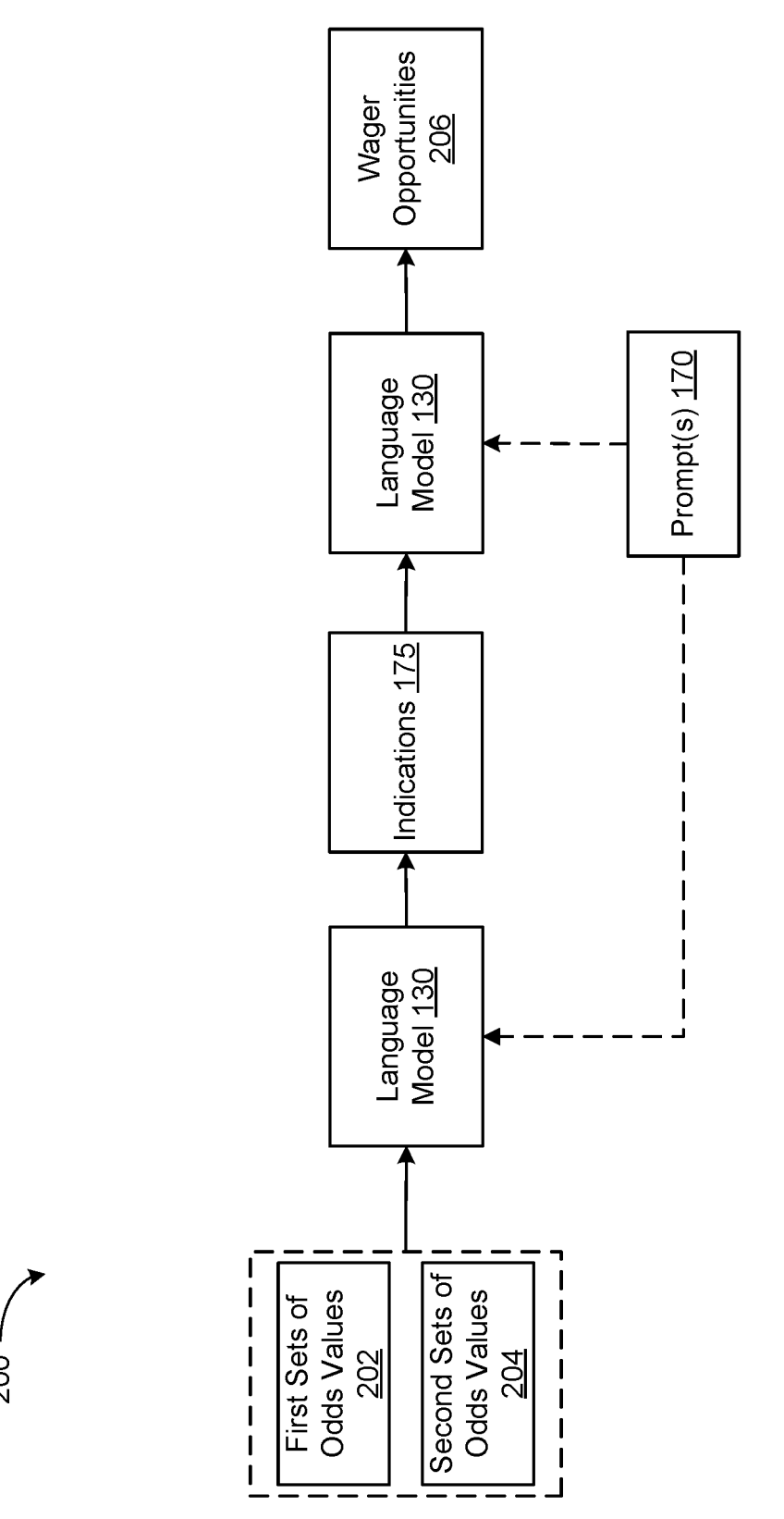
FIG. 2 illustrates an example data flow system for generating data structures, in accordance with one or more implementations.

FIG. 2 illustrates an example data flow diagram 200 for generating updated wager opportunities. Referring to FIG. 2 in the context of the components described in connection with FIG. 1, illustrated is a data flow diagram 200 for generating updated wager opportunities 206 based on changes in odds values and player input (e.g., prompt 170). As shown, the data flow diagram shows how multiple sets of odds (the first set of odds 202 and the second set of odds 204, in this example) can be provided as input to the language model 130. The different sets of odds can be provided as part of an input context to the language model. In some implementations, additional live event-related data can be provided as input with the first set of odds 202 and the second set of odds 204, to potentially provide context for odds changes identified by the language model 130.

As described herein, the first set of odds 202 and the second set of odds 204 can be provided as input in a structured format that includes an identifier of a wager opportunity corresponding to each odds value. The language model 130 can generate indications 175 of changes in the odds values. In this example, the first set of odds values 202 can correspond to odds for wager opportunities at a first time period and the second set of odds values 204 can correspond to odds for those wager opportunities at a second, later time period. The language model 130 can automatically process the odds values to identify changes/shifts in odds data over time. In some implementations, the odds values can be provided with instructions as part of the input context, which may include instructions to identify changes that exceed a particular threshold or other configurable conditions.

The indications 175, once generated, can be used as input to the language model 130 to generate updated wager opportunities 160. For example, upon receiving a prompt 170 indicating a request for "hot" wagers or wagers with odds that have recently varied (e.g., by a particular amount, or generally), the data processing system can access the generated indications 175 to search/identify one or more wager opportunities 160 that satisfy the prompt. This may include classifying an intent 185 of the prompt 170, as described herein, and searching/identifying corresponding wager opportunities that satisfy the prompt and are included/identified in the list of indications 175. Identifiers of the selected wager opportunities 206 can be included in an input context for the language model 130, which can generate a corresponding output message that indicates the one or more selected wager opportunities 206, as described herein.

In some implementations, the prompt 170 from a player can include a request for odds information or bet recommendations. Although not shown here, in some implementations, the prompt 170, the first sets of odds values 202 representing historical odds values and the second sets of odds values 204 representing current odds values, can be provided to the language model 130 as part of an input context. Furthering this example, these inputs are processed by the language model 130, which uses the prompt and the comparison between the first and second sets of odds values to generate indications 175 of changed odds. The indications 175 can represent shifts/changes in the odds values for particular wager opportunities 160 and can serve as a basis for selecting and/or generating (e.g., assembling legs of a parlay) wager opportunities 206. The wager opportunities 206 can include indications of real-time odds values changes, providing players with actionable and timely betting options based on the latest available data and the specific input from the player's prompt.

Figure 3:
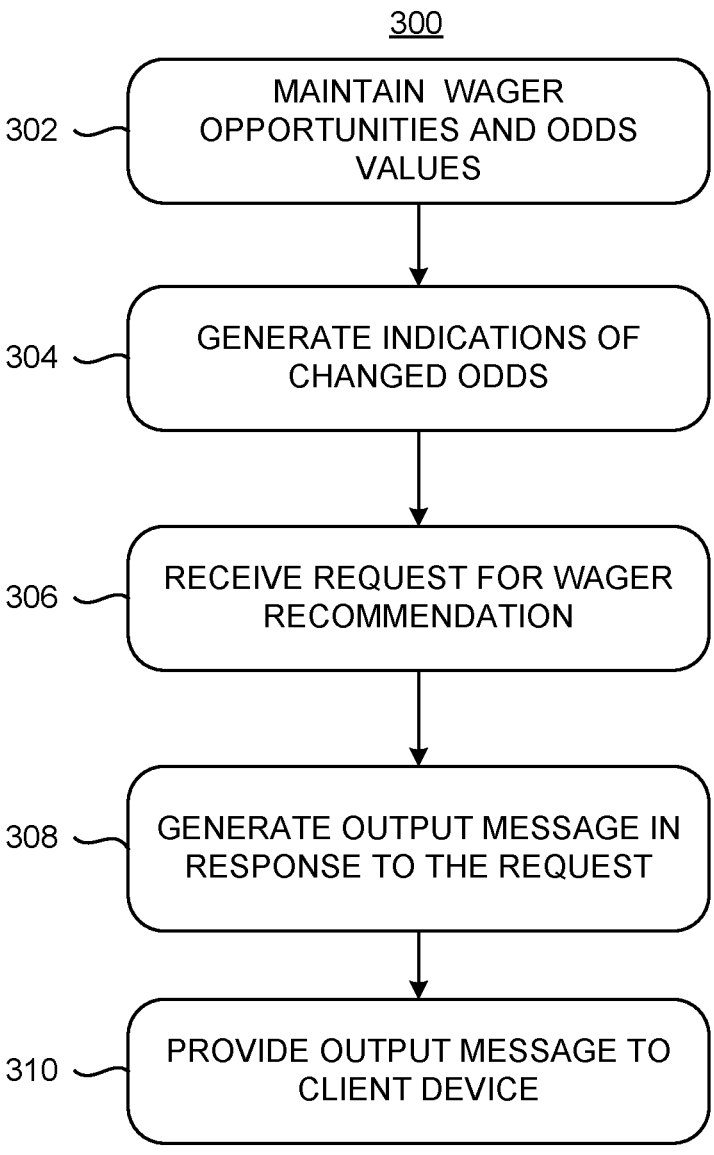
FIG. 3 illustrates an example flow diagram of a method of generating data structures using language models based on distributed network communications, in accordance with one or more implementations.

Referring to FIG. 3, illustrated is an example flow diagram of a method 300 for generating data structures using language models based on distributed network communications, in accordance with one or more implementations. In brief overview of the method 300, the data processing system (e.g., the data processing system 105, etc.) can maintain one or more wager opportunities (STEP 302), generate indications of changed odds for the plurality of wager opportunities (STEP 304), receive from a client device a prompt comprising a request for a wager recommendation (STEP 306), generate an output message identifying at least one wager opportunity of the plurality of wager opportunities selected to satisfy the request (STEP 308), and provide the output message to the client device in response to the request (STEP 310).

In further detail of method 300, at STEP 302, the data processing system can maintain a plurality of wager opportunities (e.g., multiple betting options). Each of the plurality of wager opportunities can correspond to a first set of odds values for a first time period and a second set of odds values for a second time period. For example, the first time period can before the live event begins or in early stages of the live event. The first set of odds values can represent the payout ratio or probabilities associated with wager opportunities at an earlier point in time (e.g., first time period). The first set of odds values can be based on initial statistics (e.g., team performance, athlete form), historical data (e.g., win/loss records, trends in similar events), and/or market sentiments, which are calculated during an initial/baseline time period. The second set of odds values can be referred to as current odds, which are calculated during a time period after the initial/baseline time period. The second set of odds values can correspond to the second time period (e.g., after a portion of the live event has occurred). The second set of odds values can reflect real-time conditions (e.g., live events game updates, market activities such as shifts in wager, etc.). The amount of time between calculation of the baseline/initial odds may vary on a per-wager opportunity basis, and may be configurable via input to the data processing system, via configuration settings, or specified in one or more requests/prompts.

At STEP 304, the data processing system can generate, using the language model, the first set of odds values, and the second set of odds values, a plurality of indications of changed odds for the plurality of wager opportunities. The indications can be numerical values that can be and can represent changes or fluctuations in odds values over time for the plurality of wager opportunities. In some implementations, additional contextual information can be provided as part of an input context for one or more wager opportunities. Such contextual information may include live sports data (e.g., changes in scores, changes in player lineups/team configuration, indications of any events that occur during a live sporting event, etc.). The contextual information may be retrieved from a data repository/data source that stores/provides up-to-date information relating to one or more live events and/or occurrences associated therewith.

The data processing system can include the contextual information in the input context with the first and second set of odds values such that the language model can generate the indications to include information relating to potential reasons odds changed within a given time period (e.g., the time period between calculation of the first and second sets of odds). The data processing system can access the data repository and retrieve contextual information using the identifier of each wager opportunity for which changes in odds are to be determined. In some implementations, an input prompt provided by a client device can specify one or more wager opportunities (or a class, category, or set of wager opportunities) for which odds are to be compared (e.g., indications are to be generated).

At STEP 306, the data processing system receive, from a client device (e.g., smartphone, tablet, or computer), a prompt comprising a request for a wager recommendation. A player can send the prompt from the client device. The prompt can include a bet or wager based on criteria, threshold, or attributes. In some implementations, the prompt can include a request (which may be classified as a particular intent 185) for wager opportunities or live event information corresponding to odds that have recently changed. The intent may include additional information relating to how type of sports, teams, athletes/participants, etc. that can be used to select and/or specify odds comparison for different wager opportunities. As described herein, the data processing system can select wager opportunities that satisfy the classified intent of one or more prompt(s).

At STEP 308, the data processing system can generate an output message using the language model, the prompt, and the plurality of indications of changed odds. The output message can identify at least one wager opportunity of the plurality of wager opportunities selected to satisfy the request in the input prompt. In some implementations, the message can identify a change in odds associated with the at least one wager opportunity. In some implementations, the output message may include a natural language response message explaining (e.g., based on the contextual information corresponding to the input prompt) one or more potential reasons odds of the selected wager opportunity/opportunities have changed. As described herein, the language model can include a natural language processing model (e.g., GPT) to interpret the player's request (e.g., prompt) and analyze the prompt for wager opportunities. The wager opportunities can include betting options derived from the player's request and the relevant sports data. At STEP 310, the data processing system can provide the output message to the client device in response to the request.

Figure 4:
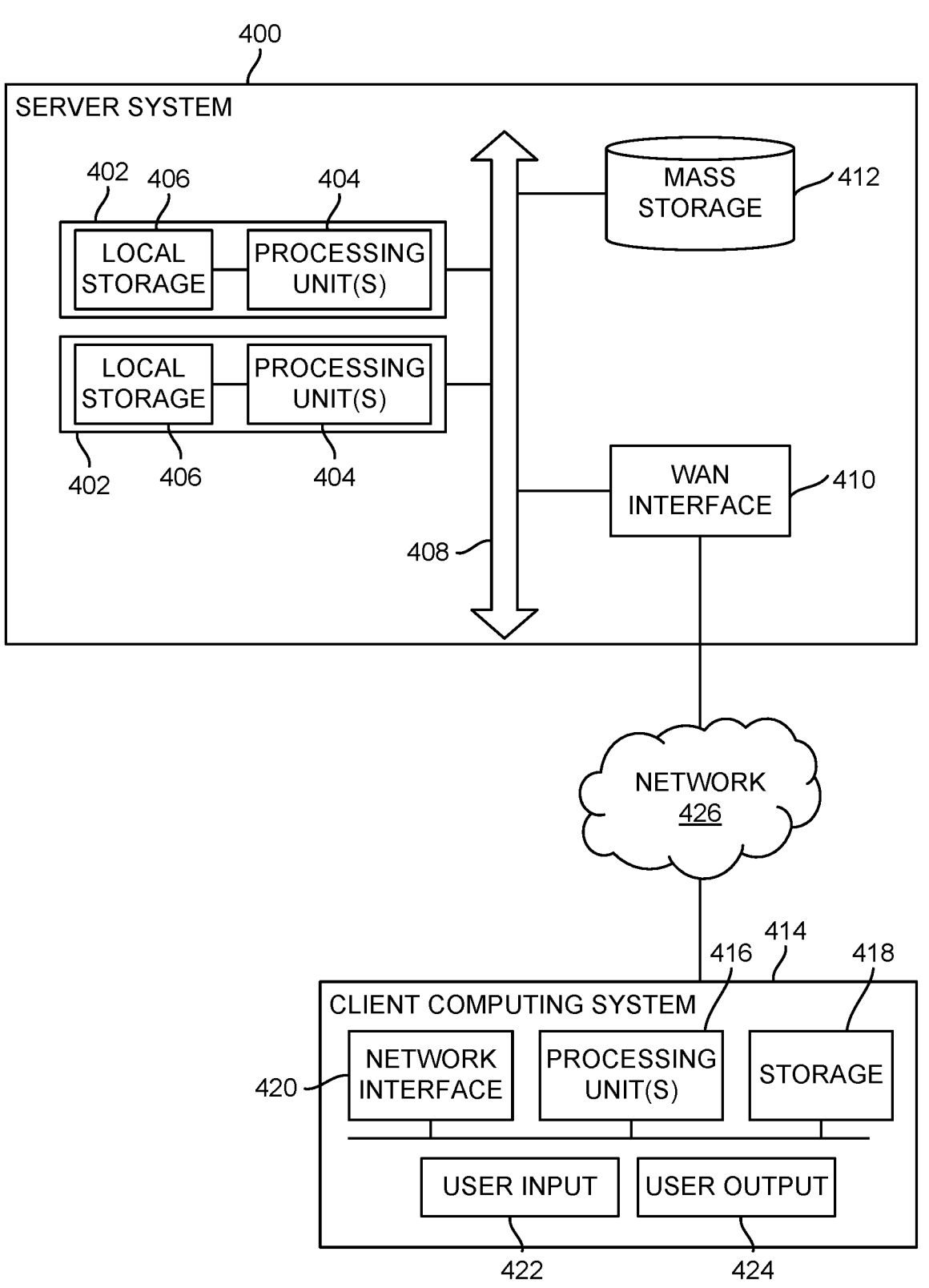
FIG. 4 illustrates a block diagram of a server system and a client computer system in accordance with an illustrative implementation.

Various operations described herein can be implemented on computer systems. FIG. 4 shows a simplified block diagram of a representative server system 400, client computer system 414, and network 426 usable to implement certain implementations of the present disclosure. In various implementations, server system 400 or similar systems can implement services or servers described herein or portions thereof. Client computer system 414 or similar systems can implement clients described herein. The system (e.g., the data processing system 105A) and others described herein can be similar to the server system 400.

Server system 400 can have a modular design that incorporates a number of modules 402; while two modules 402 are shown, any number can be provided. Each module 402 can include processing unit(s) 404 and local storage 406.

Processing unit(s) 404 can include a single processor, which can have one or more cores, or multiple processors. In some implementations, processing unit(s) 404 can include a general-purpose primary processor as well as one or more special-purpose co-processors such as graphics processors, digital signal processors, or the like. In some implementations, some or all processing units 404 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 406 can store one or more software programs to be executed by processing unit(s) 404, such as an operating system and/or programs implementing various server functions such as functions of the data processing systems 105.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and the network 426, such as the Internet. Technologies can be used, including wired (e.g., Ethernet, IEEE 802.3 standards) and/or wireless technologies (e.g., Wi-Fi, IEEE 802.11 standards).

In some implementations, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some implementations, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some implementations, WAN interface 410 can connect multiple server systems 400 to each other, providing scalable systems capable of managing high volumes of activity. Techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to the network 426, such as a wide area network (e.g., the Internet) to which WAN interface 410 of server system 400 is also connected. In various implementations, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various implementations, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with implementations of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor can receive instructions and data from a read-only memory or a random access memory or both. The elements of a computer include a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system described herein can include clients and servers. For example, the gaming system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from their characteristics thereof. The systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
one or more processors coupled to non-transitory memory, the one or more processors configured to:
maintain a plurality of wager opportunities, each of the plurality of wager opportunities corresponding to a first set of odds values for a first time period and a second set of odds values for a second time period;
generate a plurality of indications of changed odds for the plurality of wager opportunities, wherein the plurality of indications of changed odds is derived using i) a language model, ii) the first set of odds values, and iii) the second set of odds values;
receive, from a client device, a prompt comprising a request for a wager recommendation;
generate an output message identifying at least one wager opportunity of the plurality of wager opportunities selected to satisfy the request, wherein the output message identifies a change in odds associated with the at least one wager opportunity, wherein the output message is derived using i) the language model, ii) the prompt, and iii) the plurality of indications of changed odds;
provide the output message to the client device in response to the request; and
generate an input context for the language model using i) the prompt and ii) the output message.

2. The system of claim 1, wherein the client device is associated with a player profile, and wherein the one or more processors are further configured to:
determine that the output message is to be generated using the plurality of indications of changed odds based on at least one historical wager identified in the player profile.

3. The system of claim 1, wherein the one or more processors are further configured to:
determine that the output message is to be generated using the plurality of indications of changed odds based on the prompt received from the client device.

4. The system of claim 3, wherein the one or more processors are further configured to:

classifying an intent of the prompt as requesting one or more wager opportunities having changed odds that satisfy an odds change threshold.

5. The system of claim 4, wherein the one or more processors are further configured to:
determine the odds change threshold based on the request; and
select a subset of the plurality of indications of changed odds for inclusion in the input context of the language model based on the odds change threshold.

6. The system of claim 1, wherein each indication of the plurality of indications of changed odds comprise an identifier of a respective wager opportunity of the plurality of wager opportunities.

7. The system of claim 1, wherein the client device is associated with a player profile identifying a wager associated with a first wager opportunity of the plurality of wager opportunities, and wherein the one or more processors are further configured to:
determine that a first indication of the plurality of indications of changed odds corresponds to the first wager opportunity; and
provide a notification to the client device identifying the first indication.

8. The system of claim 1, wherein the request is a first request and wherein the one or more processors are further configured to:
receive a second request from the client device identifying the at least one wager opportunity;
determine that the at least one wager opportunity corresponds to an indication of the plurality of indications of changed odds that exceeds a threshold; and
automatically generate a second output message identifying at least one second wager opportunity of the plurality of wager opportunities, wherein the second output message is derived using i) the language model, ii) the indication, and iii) the plurality of wager opportunities.

9. The system of claim 1, wherein the one or more processors are further configured to:
determine a respective frequency at which each of the plurality of wager opportunities are placed; and
generate the output message further based on the respective frequency at which each of the plurality of wager opportunities are placed.

10. A method, comprising:
maintaining, by one or more processors coupled to non-transitory memory, a plurality of wager opportunities, each of the plurality of wager opportunities corresponding to a first set of odds values for a first time period and a second set of odds values for a second time period;
generating, by the one or more processors a plurality of indications of changed odds for the plurality of wager opportunities, wherein the plurality of indications of changed odds is derived using i) a language model, ii) the first set of odds values, and iii) the second set of odds values;
receiving, by the one or more processors, from a client device, a prompt comprising a request for a wager recommendation;
generating, by the one or more processors an output message identifying at least one wager opportunity of the plurality of wager opportunities selected to satisfy the request, wherein the output message identifies a change in odds associated with the at least one wager opportunity wherein the output message is derived using i) the language model, ii) the prompt, and iii) the plurality of indications of changed odds;

providing, by the one or more processors, the output message to the client device in response to the request; and generating, by the one or more processors, an input context for the language model using i) the prompt and ii) the output message.

11. The method of claim 10, wherein the client device is associated with a player profile, and further comprising:

determining, by the one or more processors, that the output message is to be generated using the plurality of indications of changed odds based on at least one historical wager identified in the player profile.

12. The method of claim 10, further comprising:

determining, by the one or more processors, that the output message is to be generated using the plurality of indications of changed odds based on the prompt received from the client device.

13. The method of claim 12, further comprising:

classifying, by the one or more processors, an intent of the prompt as requesting one or more wager opportunities having changed odds that satisfy an odds change threshold.

14. The method of claim 13, further comprising:

determining, by the one or more processors, the odds change threshold based on the request; and selecting, by the one or more processors, a subset of the plurality of indications of changed odds for inclusion in the input context of the language model based on the odds change threshold.

15. The method of claim 10, wherein each indication of the plurality of indications of changed odds comprise an identifier of a respective wager opportunity of the plurality of wager opportunities.

16. The method of claim 10, wherein the client device is associated with a player profile identifying a wager associated with a first wager opportunity of the plurality of wager opportunities, and further comprising:

determining, by the one or more processors, that a first indication of the plurality of indications of changed odds corresponds to the first wager opportunity; and providing, by the one or more processors, a notification to the client device identifying the first indication.

17. The method of claim 10, wherein the request is a first request, and further comprising:

receiving, by the one or more processors, a second request from the client device identifying the at least one wager opportunity;

determining, by the one or more processors, that the at least one wager opportunity corresponds to an indication of the plurality of indications of changed odds that exceeds a threshold; and automatically generating, by the one or more processors a second output message identifying at least one second wager opportunity of the plurality of wager opportunities, wherein the second output message is derived using i) the language model, ii) the indication, and iii) the plurality of wager opportunities.

18. The method of claim 10, further comprising:

determining, by the one or more processors, a respective frequency at which each of the plurality of wager opportunities are placed; and generating, by the one or more processors, the output message further based on the respective frequency at which each of the plurality of wager opportunities are placed.

\*   \*   \*   \*   \*